US005531853A

United States Patent [19]

Cubow et al.

[11] Patent Number: 5,531,853

[45] Date of Patent: Jul. 2, 1996

[54] LINERLESS LABEL APPLICATOR

[75] Inventors: Joseph Cubow, Vero Beach; Charles Tritt, Sebastian both of Fla.; Mark S. Casper, Williamsville, N.Y.

[73] Assignee: Booth Manufacturing Company, Fort Pierce, Fla.

[21] Appl. No.: 332,483

[22] Filed: Oct. 31, 1994

[51] Int. Cl.[6] .......... B32B 31/00

[52] U.S. Cl. .......... 156/521; 156/362; 156/538; 226/181

[58] Field of Search .......... 156/517, 521, 156/362, 542, 566, 567, 568, DIG. 31, 555, 538; 226/181, 183

[56] References Cited

U.S. PATENT DOCUMENTS

| | | | |
|---|---|---|---|
| 3,587,376 | 6/1971 | Hirano et al. . | |
| 3,902,954 | 9/1975 | Lotto . | |
| 3,911,771 | 10/1975 | Schleifenbaum . | |
| 4,029,537 | 6/1977 | Kish | 156/521 X |
| 4,149,484 | 4/1979 | Koch . | |
| 4,297,930 | 11/1981 | Putzke . | |
| 4,557,169 | 12/1985 | Kajiya et al. . | |
| 4,626,313 | 12/1986 | Karp | 156/362 |
| 4,784,714 | 11/1988 | Shibata | 156/DIG. 31 X |
| 4,892,019 | 1/1990 | Kogane et al. . | |
| 4,972,743 | 11/1990 | Nojima . | |
| 5,342,461 | 8/1994 | Murphy | 156/542 X |
| 5,375,752 | 12/1994 | Michalovic . | |
| 5,378,301 | 1/1995 | Boreali et al. . | |
| 5,417,783 | 5/1995 | Boreali et al. . | |
| 5,431,763 | 7/1995 | Bradshaw . | |
| 5,437,228 | 8/1995 | Uland . | |

*Primary Examiner*—James Engel
*Attorney, Agent, or Firm*—Nixon & Vanderhye

[57] ABSTRACT

A linerless label in web form is fed by a pair of nip rollers to a cutting device for forming discrete linerless labels subsequently applied to a product by an applicator head. The nip rollers have circumferentially extending, axially spaced ribs in registry with one another. The roller in opposition to the adhesive on one side of the web is a pressure roller having the rib surfaces plasma-coated to preclude the adhesive from sticking to the roller. Fingers with plasma coating extend through grooves between the ribs of the bottom rollers and underlie the web as it is driven by the rollers to the cutting device. Vacuum pressure is applied to an applicator head downstream of the cutting device to retain the discrete label on the head until applied to a product moving below the head. Throughout the operation, the plasma-coated surfaces prevent the adhesive from sticking to the machine components and the accumulation of adhesive residue on the machine.

17 Claims, 3 Drawing Sheets

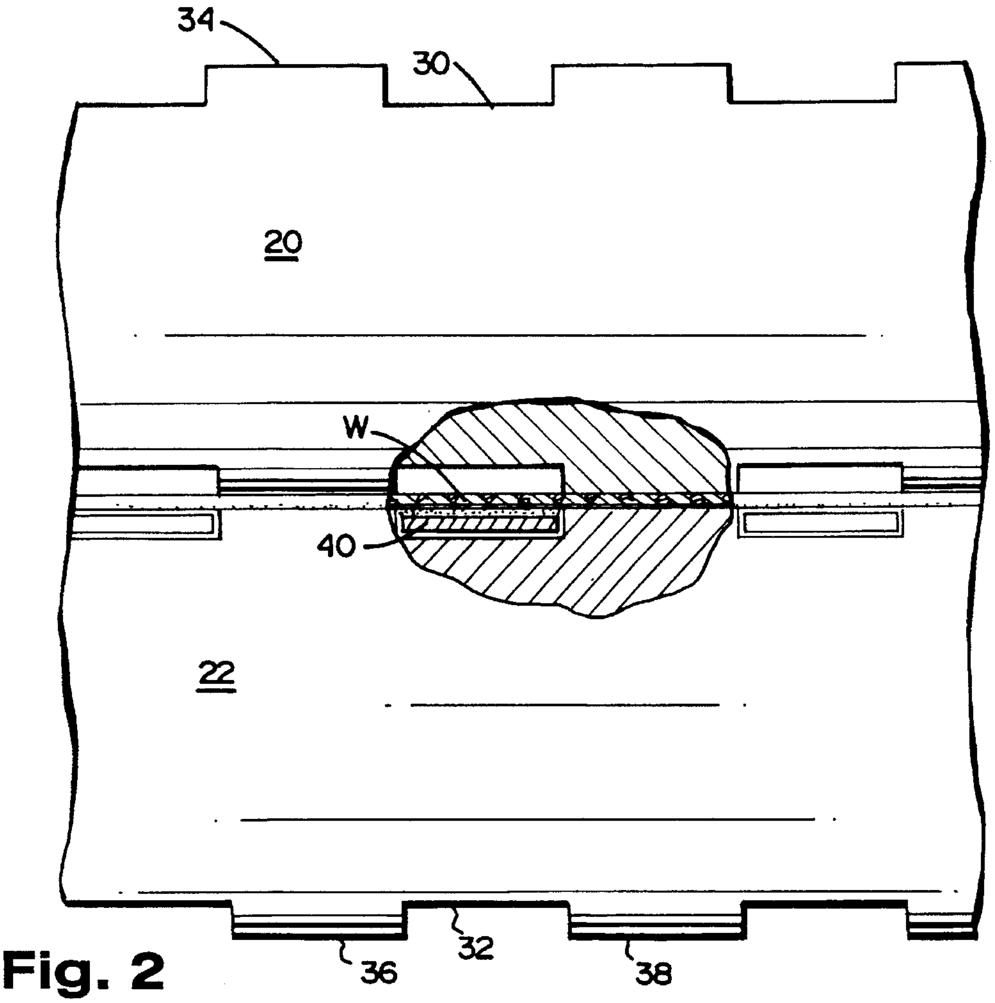
Fig. 2
Fig. 3
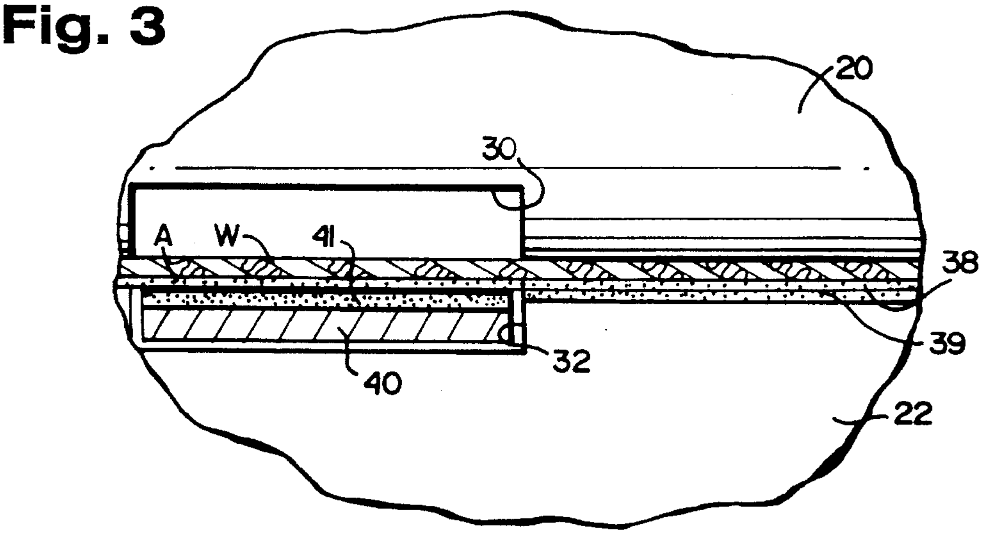

LINERLESS LABEL APPLICATOR

TECHNICAL FIELD

The present invention relates to a linerless label applicator and particularly to an applicator for cutting and applying linerless labels to articles of various sizes and shapes in an automatic high-speed environment.

BACKGROUND

Linerless labels are becoming increasingly more popular because of the advantages associated with such labels. Such advantages include the absence of a liner which otherwise requires disposal when the labels are dispensed and applied to an article or a product. Linerless labels typically are supplied in a continuous web form and have an adhesive along one side and a release surface along the other side so that the linerless labels can be formed into and dispensed from a roll. The adhesive may be a permanent adhesive, removable adhesive or a repositional adhesive, depending upon the ultimate use of the labels.

For typical pressure-sensitive label applicators, a backing paper or liner is used to drive the web of labels for application to the products. With linerless label stock, however, there is no liner and, accordingly, machinery must be devised to process the stock through feeding, cutting and applicator operations. Because the linerless label web does not have a backing or a liner, the labels are not separated from one another and must be cut from the web before they are applied. With the adhesive exposed along one side of the linerless label web, it will be appreciated that the web must be driven or fed through machinery for cutting the labels and applying the cut labels to an article or product without the label stock adhering to the machinery components or leaving a residue of adhesive on the driving, cutting and applicator machine components.

DISCLOSURE OF THE INVENTION

In accordance with the present invention, there is provided a linerless label applicator for feeding a continuous web of linerless labels to a label separator or cutter for forming individual labels and applying those individual labels to the articles. It will be appreciated that the linerless labels are preprinted with labeling information and are supplied as a continuous web in roll form. The applicator hereof thus feeds the linerless label web from the roll through cutting and label applying operations. The feed or drive device for supplying the continuous web of linerless labels to a cutter includes a pair of grooved nip rollers. Circumferentially extending, axially spaced grooves are formed about the surfaces of each of the rollers and which grooves, in turn, form circumferentially extending, axially spaced ribs having outer circumferential faces for engaging the opposite sides of the linerless label stock. One roller is a high friction roller, preferably formed of a urethane material, while the other roller is a pressure roller, preferably constructed of aluminum. The latter roller has a coating along the circumferentially extending rib faces affording a substantially non-stick surface, preventing sticking of the adhesive along the adhesive side of the linerless label stock to the drive rollers. Preferably, those rib faces on the pressure roller are plasma-coated to provide a very high release, low-friction surface. The urethane roller is uncoated and provides a ribbed high friction surface. With the ribs of the rollers in registration with one another, the pressure roller exerts sufficient pressure against the urethane roller to enable the linerless label web to be driven toward a label separator, e.g., a cutting device for forming discrete linerless labels from the label stock, without sticking to and leaving adhesive residue on the feed components.

The cutter preferably comprises a pair of knife edges with one edge movable toward and away from the other edge. Thus, as the web is fed through the cutter, the knife edges cooperate to cut discrete linerless labels from the stock. That is, once a predetermined length of label stock has been advanced through the cutter, the drive for the rollers, for example, a stepper motor, is stopped. This can be accomplished by a photoelectric sensor which senses a mark printed on the adhesive side of the linerless label stock. Once the label stock is stopped, the cutter cycles and severs a predetermined length of the linerless label stock to form a discrete linerless label. It will be appreciated that the cuts through the label stock are performed at intervals corresponding to intervals between preprinted label information on the label stock.

With the cut label projecting from the cutting device, an applicator head having a platen supplied with vacuum air pressure grasps the cut label to hold the cut label against the platen prior to and during application of the label to the article. For example, the cut label is retained on the platen by the vacuum until a signal indicates the presence of an article below the head. The head is then extended, preferably by an air cylinder, to apply the label onto the product, i.e., the label is essentially tamped onto the product. The adhesive force is sufficiently strong to enable the label to adhere to the product as the applicator head is retracted notwithstanding the applied vacuum. Alternatively, the vacuum can be interrupted or a positive air pressure can be applied to the applicator head when applying the label to the product to facilitate release of the label from the applicator head. By employing a positive air pressure, the label is effectively blown from the platen head onto the article. As a further alternative, the label can be advanced onto or in close juxtaposition to the product while attached to the label stock. Once the label is so located, it can be cut and then wiped, for example, by a brush, onto the article.

Various other features of the present invention are also provided. For example, there is provided a blower along the underside of the cut labels which facilitates the location of the cut label against the platen along the underside of the applicator head. The blower also assists the label to break away from the bottom cutter blade as the cutter blade retracts. A guide is also provided at the exit end of the cutting device to prevent the label from coiling up the back side of the applicator head once the label has been cut from the label stock. The guide also retains a lubricant wick for lubricating the top cutter blade and preventing the label from adhering to the cutter.

In a preferred embodiment according to the present invention, there is provided an applicator for applying to an article a linerless label having an adhesive exposed along one side thereof, comprising a label feed device including a pair of nip rollers having a plurality of circumferentially extending, axially spaced grooves forming circumferentially extending, axially spaced ribs along the outer surfaces of the rollers for engaging and displacing the label in a downstream direction upon rotation of the rollers, the ribs of one of the rollers having circumferentially extending plasma-coated surfaces for engaging at least the side of the label having the exposed adhesive and an applicator head for applying the label to the article.

In a further preferred embodiment according to the present invention, there is provided an application for applying linerless labels to articles wherein the linerless labels are provided in a continuous web having an adhesive exposed along one side thereof, comprising a label feed device including a pair of nip rollers having a plurality of circumferentially extending, axially spaced grooves forming circumferentially extending, axially spaced ribs along the outer surfaces of the rollers for engaging and displacing the web of linerless labels in a downstream direction upon rotation of the rollers, the ribs of one of the rollers having circumferentially extending surfaces formed of a non-stick material for engaging at least the side of the web of linerless labels having the exposed adhesive, a plurality of feed fingers disposed along at least one side of the web of labels and located within the grooves of one roller to facilitate transport of the web through the rolls, the fingers having surfaces formed of a non-stick material in opposition to one side of the web, a pair of knife edges with at least one knife edge mounted for movement toward and away from another of the knife edges for cutting labels from the web, an applicator head for applying the labels to the articles, including a platen having a vacuum applied thereto to releasably adhere the separated labels to the platen and means for moving the platen toward and away from articles to be labelled for applying the labels to the articles.

Accordingly, it is a primary object of the present invention to provide a novel and improved linerless label applicator for facilitating transport of the linerless label stock to and through a cutting device to form discrete linerless labels and onto an applicator head for applying the cut linerless labels to products moving into alignment with the applicator head.

BRIEF DESCRIPTION OF THE DRAWINGS

FIG. 2 is an enlarged elevational view of the feed device with parts thereof in cross-section;

FIG. 3 is a partial exploded view illustrating portions of the feed device of FIG. 2.

BEST MODE FOR CARRYING OUT THE INVENTION

Figure 1:
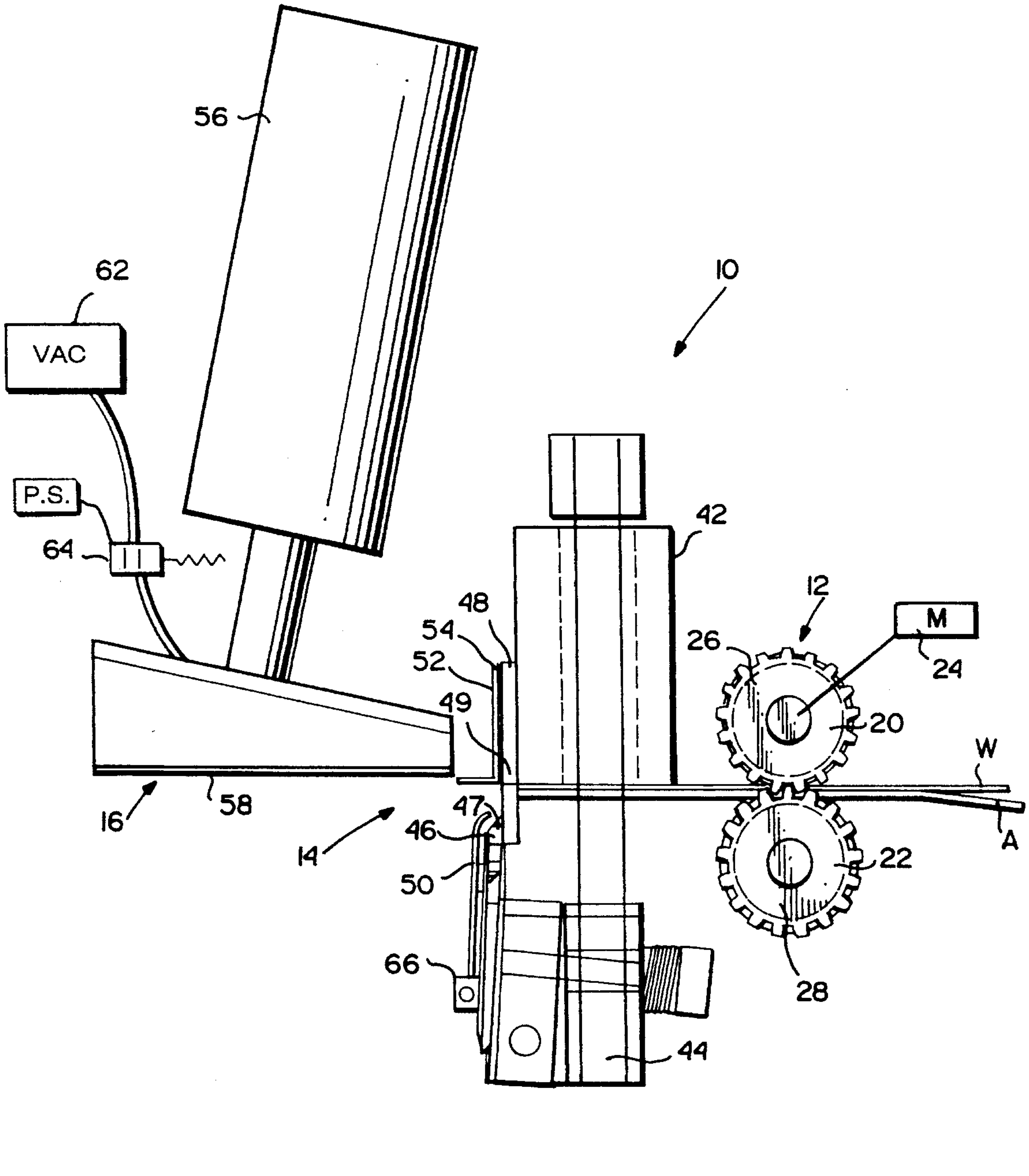
FIG. 1 is a side elevational view of a linerless label applicator according to the present invention.

Referring now to the drawings, particularly to FIG. 1, there is illustrated a linerless label applicator, generally designated 10, and comprised of a drive or feed device, generally designated 12, for feeding a linerless label web W to a separator or cutting device, generally designated 14, where discrete labels are sequentially formed. The labels are then supplied in sequence to an applicator head, generally designated 16, for application to articles or products passing, preferably intermittently, below the applicator head. It will be appreciated that the linerless label web W has one side bearing adhesive A, e.g., permanent, removable or repositional adhesive as the end use dictates, and an opposite side free of adhesive usually having a release coating such that the web can be supplied in roll form, e.g., from a roll 18. The linerless label web is continuous and preprinted with labelling information, either repeating or non-repeating information, at discrete intervals. The web is, of course, intended to be separated or severed between the labelling information to form discrete labels for application to an article or a product.

Figure 4:
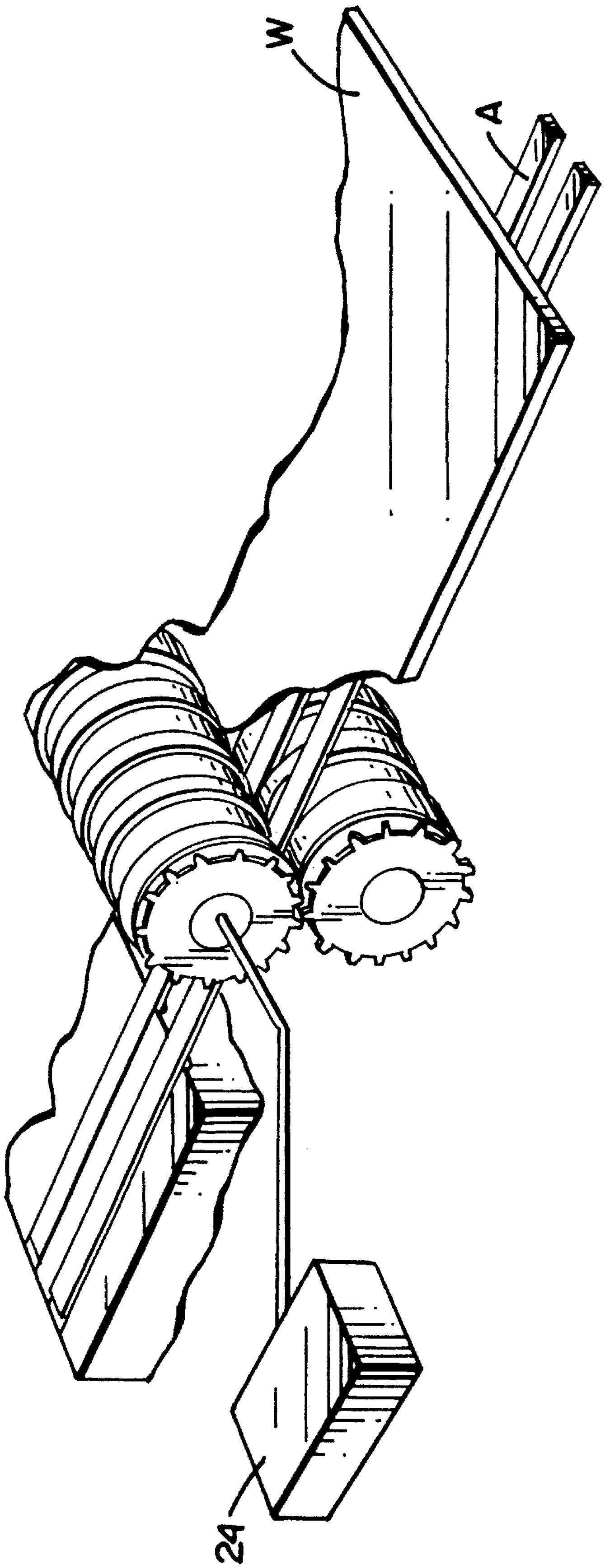
FIG. 4 is a perspective view of the rollers, feed fingers and web passing through the nip of the rollers.

To feed the linerless label web W to the cutting device 14 and ultimately to the applicator head 16, there is provided in accordance with the present invention a pair of nip rollers 20 and 22. The nip rollers are driven by a stepper motor 24 through intermeshing gears 26 and 28 along one side of the rollers 20 and 22. As best illustrated in FIGS. 2–4, rollers 20 and 22 are provided with circumferentially extending, axially spaced grooves 30 and 32 defining circumferentially extending, axially spaced ribs 34 and 36, respectively. As illustrated, the grooves 30 and 32 of the rollers 20 and 22, respectively, lie in registration with one another. Likewise, the ribs 34 and 36 of the rollers 20 and 22 lie in registration one with the other. Thus, the web W of the continuous label stock is supplied through the nip of the rollers, i.e., between the faces of the ribs, and fed in a downstream direction toward the cutting device 14.

To accommodate the exposed adhesive A on one side of the paper web, a very low-friction, non-stick surface is provided on the faces of the ribs of the roller in opposition to the side of the web bearing the adhesive. More particularly, and preferably, a plasma coating 39 is provided the outer or circumferentially extending surfaces of the ribs 36 of roller 22 in opposition to the adhesive side of the web. This plasma coating 39 provides a non-sticking surface preventing adhesive on the face of the web W from adhering on the roller 22. Exemplary plasma coatings particularly suitable for this purpose are plasma coatings 915 and 936, both being very high-release, low-friction coatings, available from Plasma Coatings of Waterbury, Conn. Preferably, the lower roller 22 is formed of aluminum to accommodate and retain the plasma coating on the rib surfaces 38.

Roller 22 with its anti-stick rib surfaces also constitutes a pressure roller for applying pressure against the opposite roller 20. Roller 20 is preferably formed of a high-friction material, for example, a urethane. In this manner, the pressure applied to the web W at the nip between the rollers 20 and 22 and against the upper roller 20 enables the upper roller 20 to frictionally drive the web through the nip toward the cutting device 14.

To further facilitate the feed, transport and support of the web W through the rollers 20 and 22 to the cutting device 14, a plurality of elongated, generally horizontally spaced fingers 40 are disposed under the web W and in opposition to the adhesive side of the web. The fingers 40 extend upstream of the nip rollers 20 and 22 and preferably terminate in a tapered edge to facilitate entry of the web W onto the fingers 40. The fingers 40 also extend through the grooves 32 of the lower roller 22 and into the cutting area, described hereafter. The fingers 40 are preferably provided along their upper surface with a non-stick surface 41, for example, the same plasma coating may be applied to the upper surfaces of the fingers as applied to the surfaces 38 of the ribs 36 of roller 22. Consequently, it will be appreciated that the web W is under positive control as the nip rollers feed the web in a downstream direction along the fingers 40 toward the cutting device 14.

Upper and lower mounting structures 42 and 44, respectively, are provided for mounting the cutting device 14. The cutting device 14 includes a lower guillotine-type blade 46 having an angled knife edge 47 and which is mounted for movement toward and away from an upper fixed cutting blade 48, also having a knife edge 49. Thus, the blades 46 and 48 perform a scissors-type cutting action on the web as the web passes between the upper and lower mounts and between the knife edges. The lower knife edge may be reciprocated by any suitable means, for example, by an air cylinder.

Carried by the lower knife blade 46 is a cutter blade guard 50 also having an anti-stick surface. The guard is preferably plasma-coated, as described above with respect to roller 22 and fingers 40. The reciprocating movement of guard 50 with the knife blade prevents the label from adhering to the edge of the cutter blade as the blade moves up and down. Further, a guide 52 is mounted on the upper cutter blade mount 42. The guide 52 is generally L-shaped, with the bottom of the L-shaped guide projecting along the path of movement of the label downstream of the knife edges. The projection of the guide forwardly of the knife edges prevents the label from coiling up along the back side of the applicator head 16. Additionally, between the guide 52 and the upper mount 42, there is provided a wick 54 for containing a lubricant. Thus, the lubricant lubricates the top cutter blade and prevents the label from adhering to the cutter.

Referring now to the applicator head 16, the head is preferably under the control of an air cylinder 56 for reciprocating movement toward and away from an article or product to which the label is to be applied. The articles are conveyed preferably continuously below the applicator head. The applicator head 16 includes a flat lower platen 58, which is preferably grooved in a longitudinal direction corresponding to the direction of web travel. The vacuum holes are located towards the leading edge of the grooves to enable the vacuum to gradually increase to the label as the label advances. Note: resistance applied to the leading edge of the label, at an advanced stage of feeding, tends to buckle the label, thereby sticking to any non-treated surfaces. The surfaces of the ribs or grid forming the underside of platen 58 are preferably formed of an ultra-high molecular weight material to provide a non-stick surface. The ribs may, however, be coated with the anti-stick plasma coatings noted above. An air line is coupled to the applicator head 16 and to a source 62 of vacuum pressure. A valve 64 may be disposed in the line 60 to provide intermittent vacuum pressure to the platen 58, for example, to hold the label to the applicator head before applying it to the article and then to facilitate release of the label from the platen 58 when applying the label to the article. Additionally, a positive pressure source P.S. may also be coupled through valve 64 to provide a blowing action on the top side of the discrete linerless label to facilitate application of the label to the product.

Further, there is provided one or more air nozzles 66 on the cutter mount. The nozzles 66 direct constant streams of air toward the underside of the platen 58 to force the discrete label cut by the knife edges 46 and 48 against the platen 58 as the label emerges from the cutting device. This flow of air also assists the label in breaking away from the bottom cutter knife edge as the blade retracts. This air pattern has to be formed so as no air flow is present at the uncut edges, thereby preventing air foil effects which cause lifting the label off the platen 58.

In use, the continuous web of linerless label stock is fed through the feed device 12 on top of the fingers 40 from the roll 18. The roll 18 is provided with a brake assembly, not shown, which engages the roll and prevents the advance of the web when the labelling operation has stopped. This prevents any over-spin of the label roll due to the weight of the roll and the inertia generated as the roll spins. The stepper motor advances the web W through the rolls and past the knife edges 46 and 48 to advance a leading label to be cut into position below the applicator head 16. By using a mark on the adhesive side of the label which may be sensed by a photoelectric sensor, the stepper motor 24 is signalled to stop the advance of the web once the leading label has cleared the cutting knife edges. Once the label web is stopped, the cutter cycles and separates the leading label from the roll. Because of guard 50 and the air blown along the underside of the cut label through nozzles 66, the cut label does not adhere to the retracting lower blade. Rather, because of the air blowing against the underside of the label and the vacuum pressure exerted by head 16, the cut label adheres to the platen 58. Consequently, the discrete label is retained on the platen head until the applicator head is signalled to apply the discrete label to an article. This is accomplished by a product sensor which senses the arrival of the product in position below the platen for application of the label. The platen 58 is then extended toward the label by operation of the air cylinder to tamp the label onto the moving product. The adhesive on the discrete label typically has sufficient strength to adhere the label to the moving product, notwithstanding the vacuum pressure and retraction of the applicator head. The vacuum pressure, however, by operation of valve 64, can be interrupted to facilitate release of the label from the platen 58 during application of the label to the product. Alternatively, positive air pressure from air pressure source P.S. can be supplied via line 60 to blow the discrete label onto the product. When the applicator head completes its cycle and returns to a home position as illustrated, it activates a switch to again activate the stepper motor 24 to advance the web W to locate a succeeding label below the platen. When the mark on the web is again sensed, the stepper motor stops, the cutting cycle is initiated, and the next discrete label is retained on the applicator head. The entire applicator cycle is thus complete and may be repeated upon the sensing of a new product in position for application of the label to the product.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An applicator for applying to an article a linerless label having an adhesive exposed along one side thereof, comprising:

a label feed device including a pair of nip rollers having a plurality of circumferentially extending, axially spaced grooves forming circumferentially extending, axially spaced ribs along the outer surfaces of said rollers for engaging and displacing the label in a downstream direction upon rotation of said rollers, the ribs of one of said rollers having circumferentially extending plasma-coated surfaces for engaging at least the side of the label having the exposed adhesive;

a plurality of feed fingers disposed along at least the side of the web of labels having the exposed adhesive and located within the grooves of said one roller for engagement with and to facilitate transport of the web through the rolls; and an applicator head for applying the label to the article.

2. An applicator according to claim 1 for applying linerless labels from a continuous web thereof and including a separator located between said rollers and said applicator head for separating a leading label from labels upstream thereof on the web of linerless labels.

3. An applicator according to claim 2 wherein said separator includes a pair of knife edges with at least one knife edge mounted for movement toward and away from another of said knife edges for cutting labels from the web.

4. An applicator according to claim 2 wherein said applicator head includes a platen having a vacuum applied thereto to releasably adhere the separated label to the platen.

5. An applicator according to claim 2 wherein said separator includes a pair of knife edges with at least one knife edge mounted for movement toward and away from another of said knife edges for cutting labels from the web, said applicator head including a platen having a vacuum applied thereto to releasably adhere the separated label to the platen and a guide between said knife edge and said head for preventing at least a portion of the cut label from coiling along an upstream side of said platen.

6. An applicator according to claim 2 wherein said applicator head includes a platen having a vacuum applied thereto to releasably adhere the separated label to the platen, and means for moving said platen toward and away from an article to be labelled for applying the label to the article.

7. An applicator according to claim 2 wherein said applicator head includes a platen having a vacuum applied thereto to releasably adhere the separated label to the platen, and means for applying air pressure to the platen to blow the label from the platen onto the article.

8. An applicator according to claim 2 including a blower for blowing air against the adhesive side of the label to force the separated label against the applicator head.

9. An applicator according to claim 1 wherein said fingers are located in opposition to the side of the web having the adhesive, and a plasma-coating on the fingers on sides thereof in opposition to the adhesive side of the web.

10. An applicator according to claim 2 wherein said rollers are formed of a high-friction material and a metal material, respectively, said roller formed of metal material having the plasma-coating faces on said ribs and constituting a pressure roller for bearing against the roller formed of high-friction material to enhance the frictional engagement between the web and the roller formed of high-friction material.

11. An applicator according to claim 1 wherein said ribs of the respective rollers lie in registration with one another across said nip, said fingers being plasma-coated, said ribs and said fingers being sized such that said ribs and said fingers form a substantially continuous support surface underlying the label between opposite side edges of the label.

12. An applicator for applying linerless labels to articles wherein the linerless labels are provided in a continuous web having an adhesive exposed along one side thereof, comprising:

a label feed device including a pair of nip rollers having a plurality of circumferentially extending, axially spaced grooves forming circumferentially extending, axially spaced ribs along the outer surfaces of said rollers for engaging and displacing the web of linerless labels in a downstream direction upon rotation of said rollers, the ribs of one of said rollers having circumferentially extending surfaces formed of a non-stick material for engaging at least the side of the web of linerless labels having the exposed adhesive;

a plurality of feed fingers disposed along at least one side of the web of labels and located within the grooves of said one roller to facilitate transport of the web through the rolls, said fingers having surfaces formed of a non-stick material in opposition to said one side of said web;

a pair of knife edges with at least one knife edge mounted for movement toward and away from another of said knife edges for cutting labels from the web;

an applicator head for applying the labels to the articles;

said head including a platen having a vacuum applied thereto to releasably adhere the separated labels to the platen; and means for moving said platen toward and away from articles to be labelled for applying the labels to the articles.

13. An applicator according to claim 12 wherein the ribs of said one roller and the fingers are plasma-coated.

14. An applicator according to claim 13 wherein said rollers are formed of a high-friction material and a metal material, respectively, said roller formed of metal material having the plasma-coating faces on said ribs and constituting a pressure roller for bearing against the roller formed of high-friction material to enhance the frictional engagement between the web and the roller formed of high-friction material.

15. An applicator according to claim 12 wherein said ribs of the respective rollers lie in registration with one another across said nip.

16. An applicator according to claim 15 wherein the ribs of said one roller and the fingers are plasma-coated at least on sides thereof in opposition to the side of the label having the exposed adhesive.

17. An applicator according to claim 16 wherein each said rib has a flat circumferentially extending surface and an axial extent for contact with the label.

* * * * *